Nov. 6, 1962
P. DE WAARD ET AL
CIRCUIT FOR THE DEMODULATION OF FREQUENCY MODULATED SIGNALS
3,063,019
Filed Oct. 2, 1959
4 Sheets-Sheet 1
FIG.1
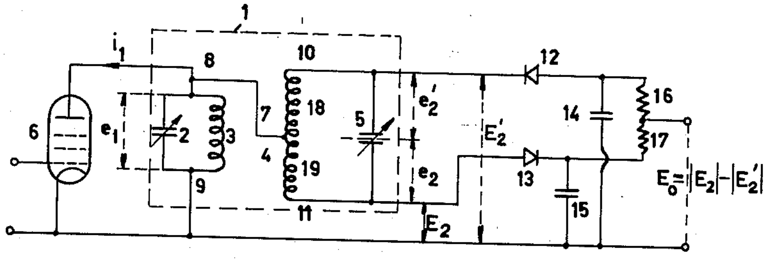
FIG.1b
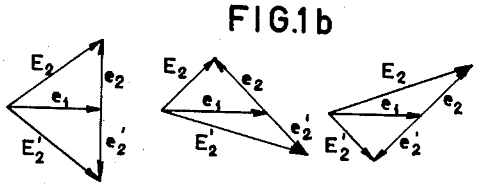
FIG.1c
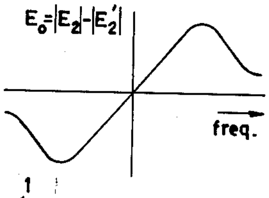
FIG.1d
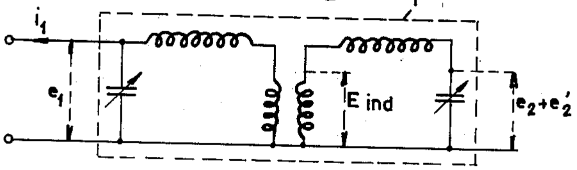
FIG.2
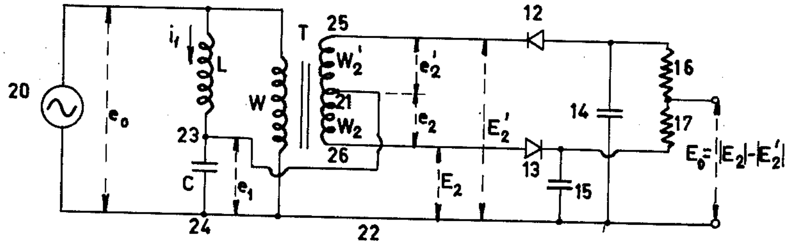
a FIG.3 b
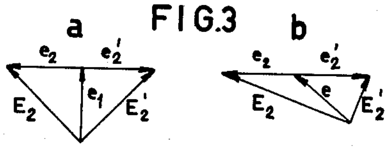
INVENTORS
Pieter De Waard and Willem A. J. Van Vaarsveld
BY
Watson, Cole, Grindle & Watson
ATTORNEYS INVENTORS
Pieter De Waard and
Willem A. J. Van Vaarsveld
BY
Watson, Cole, Grindle & Watson
ATTORNEYS INVENTORS
Pieter De Waard and Willem Q. J. Van Jaarsveld
BY
Watson, Cole, Grindle & Watson
ATTORNEYS INVENTORS
Pieter De Waard and
BY Willem A. J. Van Vaerwert
Watson, Cole, Grindle & Watson
ATTORNEYS United States Patent Office 3,063,019

Patented Nov. 6, 1962

3,063,019

CIRCUIT FOR THE DEMODULATION OF FREQUENCY MODULATED SIGNALS

Pieter de Waard, Monster, and Willem Adrianus Johannes van Jaarsvelt, Delft, Netherlands, assignors to Nederlandse Organisatie voor Toegepast-Natuurwetenschappelijk Onderzoek Ten Behoeve van Nijverheid, Handel en Verkeer, The Hague, Netherlands Filed Oct. 2, 1959, Ser. No. 844,086
Claims priority, application Netherlands Oct. 6, 1958
4 Claims. (Cl. 329—129)

The invention relates to a circuit for demodulating frequency modulated signals. In one of the most current methods for frequency demodulation, two amplitude modulated signals, which are separately rectified and subsequently subtracted from one another, are derived from the input signal or from the given signal.

Circuits of this type are generally known. They are to be found among others in Terman, Radio Engineers Handbook, 8th impression, page 586.

In these known demodulators use is made of two circuits which are tuned to the central frequency. When applied to superheterodyne receivers, whereby all the signal frequencies are transposed to a fixed intermediate frequency, the use of two resonant circuits in the relevant part of the circuit forms no drawback. But if the circuit is intended for application to a variable frequency the use of two resonant or oscillating circuits is very inconvenient.

The object of the present invention is to provide a detector circuit which can be tuned in a much simpler way. To this end this circuit distinguishes itself from the known types in that it needs only one single tunable circuit.

Moreover the known circuits are not very appropriate for very low frequencies.

It is therefore a further object of the invention to provide a detector circuit which can just as easily be constructed for high as for low and even extremely low frequencies, in the order of magnitude of acoustic or even of electric mains frequencies.

For this purpose according to the invention use is made of a signal source with a low internal impedance to the terminals of which a series resonant circuit or a series chain is connected either directly or indirectly, for instance by means of a transformer of slight leakage, which series resonant circuit at the same time feeds a rectifier circuit in such a way, that it supplies the rectifier circuit with voltages, each of which consists of a voltage derived from one of the reactances of the series circuit or chain and a voltage derived from the signal source.

The rectifying elements are connected after some commonly practiced method. One voltage is applied between the electric centres of two reactances between the ends of either of which a rectifier is connected and the other voltage is induced into or in some other way laid on one of the reactances between which the rectifiers are connected.

The series resonant circuit can be connected to the signal source either directly or with the interposition of a transformer of slight leakage. It is possible to have the primary winding of a transformer, the secondary part of which forms part of the rectifier circuit, connected in parallel to the series circuit. It is, however, also possible to connect the primary winding of the transformer, which induces a voltage in the rectifier circuit, in series to the resonant circuit or to use it as the self-inductance of the oscillating circuit. In the first-mentioned case the transformer must possess a high impedance, in the second case, when selecting the transformer, the fact should be taken into account, that it forms part of the series resonant circuit. More especially the series resonant circuit can consist of an electromechanical element connected in series with a self-inductance or a capacitance.

The invention is hereinafter further explained with the aid of drawings showing a few embodiments of the invention.

FIGURES 1*a*, 1*b*, 1*c* and 1*d* give a survey of a known circuit with the diagrams belonging to it.

FIGURE 2 shows a first embodiment of the circuit according to the invention.

FIGURE 3 shows a diagram of the various voltages in vector-form, which belongs to FIGURE 2.

Figure 5A:
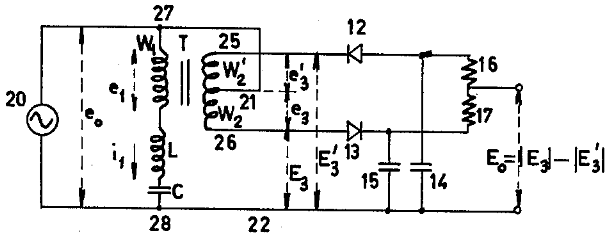
Figure 5B:
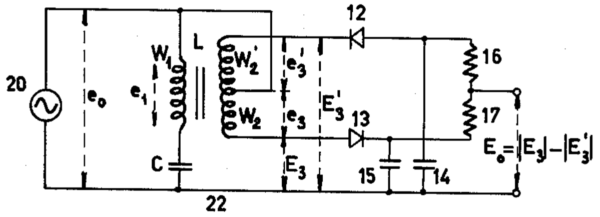

FIGURE 5*a* and 5*b* show a third embodiment.

Figure 6:
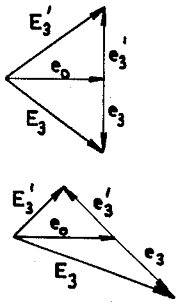

FIGURE 6 shows the voltage vectors occurring in the circuit of FIGURE 5 and

Figure 7:
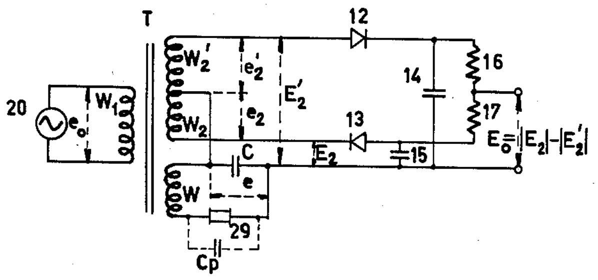

FIGURE 7 shows an embodiment having an oscillating circuit containing an electromechanical element.

Figure 8:
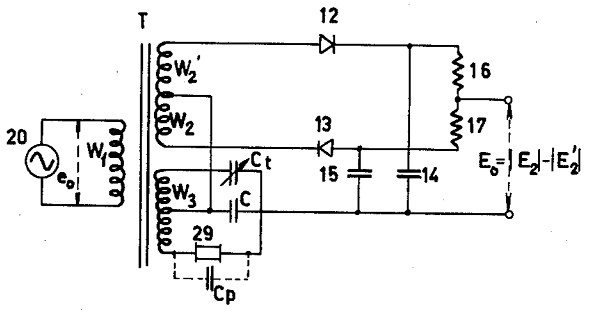

FIGURE 8 shows an embodiment of a circuit having an electromechanical element, the parasitary capacity of which has been compensated.

Figure 9:
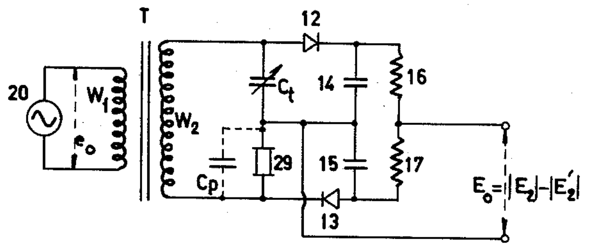

FIGURE 9 shows another possibility with a compensated crystal.

Figure 9A:
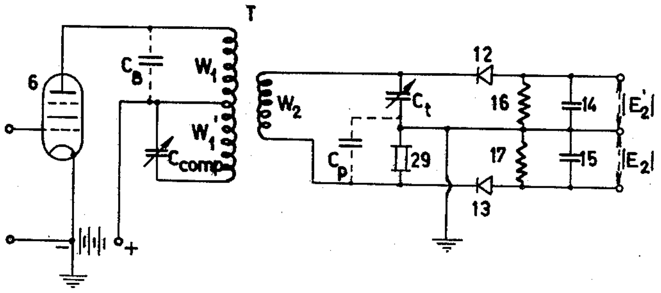

FIGURE 9*a* shows a somewhat altered circuit, suitable for connection to a voltage source with a high internal resistance.

Figure 10:
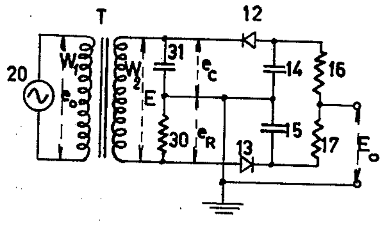

FIGURE 10 shows a circuit having a series chain comprising a resistance and a capacitance.

Figures 10A, 11A:
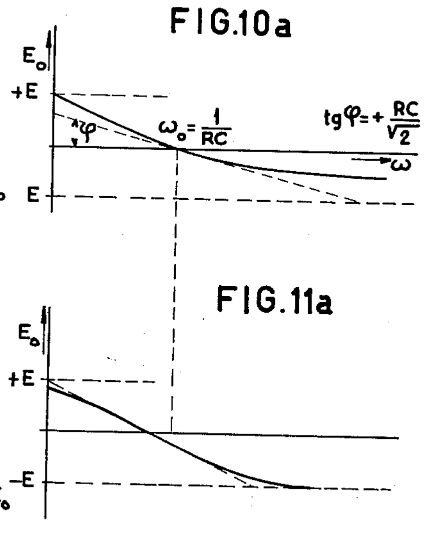

FIGURE 10*a* shows the discrimination curve belonging to FIGURE 10.

Figure 10B:
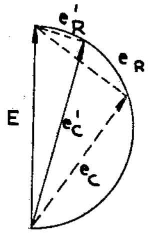

FIGURE 10*b* shows a vector diagram belonging to FIGURE 10.

Figure 11:
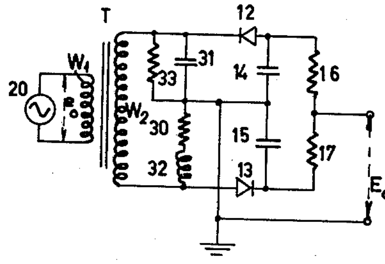

FIGURE 11 shows a circuit having a series chain according to FIGURE 10, which circuit has been corrected as to linearity.

FIGURE 11*a* shows the discrimination curve belonging to FIGURE 11.

Figure 12:
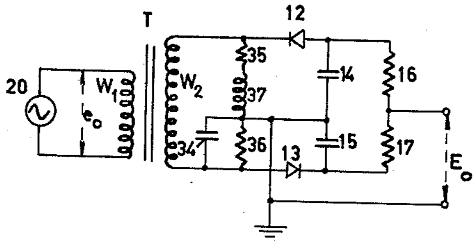

FIGURE 12 shows a circuit having a series chain comprising a resistance and a self-inductance, which circuit has been corrected as to linearity.

In these figures like reference numerals refer to corresponding elements.

In FIGURE 1*a* the primary circuit, which is formed by the condenser 2 and the self-inductance 3, of a band-pass filter 1 is fed from a voltage source 6, for instance a penthode tube supplying an alternating current $i_1$.

Both the primary circuit provided with the condenser 2 and the self-inductance 3, and the secondary circuit provided with the self-inductance 4 and the condenser 5 of the band-pass filter 1, are tuned to the central frequency of the frequency modulated signal. As is known, there exists for this frequency a phase shifting of 90° between the primary voltage $e_1$ and the secondary voltage $e_2+e'_2$. This fact has once more been elucidated in the substitution scheme of the bandpass filter in FIGURE 1*d*. It is apparent from this, that this phase shifting occurs in the secondary circuit, where the voltage on the tuning condenser has been shifted 90° relative to the induced voltage $E_{ind}$ which latter is in phase with $e_1$ and $i_1$.

The secondary coil 4 of the band-pass filter 1 in FIGURE 1*a* has a central tap 7, which is connected to one side 8 of the primary coil 3. Between the other side 9 of the primary coil 3 and the two ends 10 and 11 of the secondary coil 4 the voltages $E_2$ and $E'_2$, which are the vector sums of the voltages $e_2$ and $e'_2$ with $e_1$, present themselves. In the FIGURE 1*b* it is indicated what these vector sums are like for frequencies which are equal to, lower than or higher than, the resonance frequency of the band-pass filter 1, as the case may be. Herefrom it is apparent, that $E_2$ and $E'_2$ are amplitude modulated if $i_1$ represents a frequency modulated signal. Now with the aid of the rectifier circuit comprising the rectifiers 12 and 13, the smoothing condensers 14 and 15, and the diode load resistances 16 and 17, the absolute values of $E_2$ and $E'_2$ can be determined and subtracted from each other. The course $|E_2|-|E'_2|$ is represented in FIGURE 1*c*.

The circuit according to FIGURE 1*a* has the drawback, that the weak coupling of the two coils 3 and 4 makes it practically necessary to tune the primary coil 3 in order to get a sufficiently great $e_1$, while in addition to this the magnitude of the secondary voltage $e'_2+e_2$ is largely dependent on the correct value of the coupling, which approximately follows from the known equation $kQ=1$.

Further it is difficult to realize the necessary symmetry of the secondary coil 4, while it is also difficult to make the couplings between both halves of the secondary coil 4 and the primary coil 3 equally strong.

As the whole of the construction of the circuit is founded on a weak coupling of both coils 3 and 4, the use of this circuit 1*a* is practically limited to the higher frequencies.

In the circuits that can be obtained by applying the invention, these drawbacks are avoided through the functions of transformation and resonance being separated. This circuit comprises a series resonant circuit and a transformer having a strong coupling provided with a primary winding and with a secondary winding having a central tap.

In FIGURE 2 T is a transformer having a primary winding $W_1$ connected to a voltage source 20 having a voltage $e_0$. The secondary winding comprises two halves $W_2$ and $W'_2$, having the voltages $e_2$ and $e'_2$.

At the same time a series LC-chain is connected to the voltage source 20 having the voltage $e_0$. The centre 21 of the secondary winding and the common lead 22 of both the output voltages $E_2$ and $E'_2$ are connected on both sides 23 and 24 of the condenser C of the series LC-chain. Thus, if the frequency of the voltage source 20 is equal to the resonance frequency of the series LC-chain, then the current $i_1$ in this chain is in phase with the voltage $e_0$. The voltage $e_1$, which is present on the capacitance C, lags 90° in phase behind the current $i_1$. Between the ends 25 and 26 of the secondary winding and the common lead 22 of the output voltages $E_2$ and $E'_2$, the voltages $E_2=e_1+e_2$ and $$E'_2=e_1+e'_2$$

are present, which in this case are of equal amplitude. FIGURE 3*a* elucidates this state of things.

If the frequency of the voltage source 20 is somewhat lower than the resonance frequency of the series LC-chain, the current $i_1$ in this chain leads in phase before the voltage $e_0$. The voltage $e_1$ remains 90° in phase behind $i_1$, so that now the state of things represented in FIGURE 3*b* is brought about, from which it is apparent that now $|E_2|\neq|E'_2|$.

In FIGURE 2 a possible rectifier circuit is at the same time given by way of example. The connection between the output voltage $E_0$ of this circuit and the frequency is analogous to that of FIGURE 1*c*.

Figure 4:
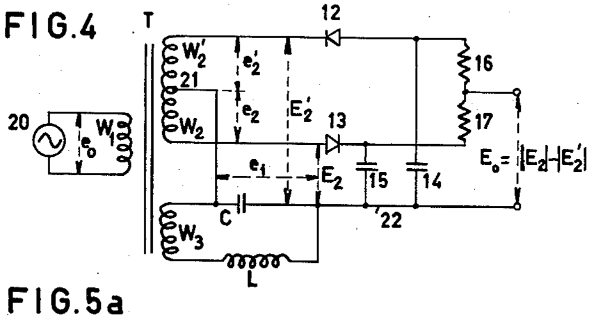
FIGURE 4 shows a second embodiment.

In FIGURE 4 another embodiment of the circuit according to the invention is represented. Herein the series LC-chain is connected to a tertiary winding $W_3$ of the transformer T, the voltage of which will generally be selected lower than the primary voltage $e_0$ and the secondary voltages $e_2$ and $e'_2$, in order to bring the current through the series LC-chain to a reasonable value. It should, however, be observed, that in principle the series LC-chain can also be arranged parallel to $W_2$ or $W'_2$, or between the centre 21 and a tap on $W_2$ or $W'_2$.

In FIGURE 5*a* the transformer T is connected in series with the series LC-chain. Now if the frequency of the voltage source 20 is equal to the resonance frequency of the series circuit of the transformer T and the LC-chain, then the current $i_1$ is, through this circuit, in phase with the voltage $e_0$. The voltage $e_1$, which is present on the primary winding $W_1$ of the transformer T, leads 90° in phase before the current $i_1$, when the secondary winding is unloaded. Now as the centre 21 of the secondary winding is connected to one side 27 of the voltage source 20, the voltages $E_3=e_0+e_3$ and $E'_3=e_0+e'_3$, which in this case are of equal amplitude, are now present between the ends 25 and 26 of the secondary winding and the common lead 22 for the two output voltages, which latter is connected to the other side 28 of the voltage source 20.

The same as in the circuits which have already been described, in this circuit also $|E_3|\neq|E'_3|$ if the frequency of the voltage source 20 is not equal to the resonance frequency of the series circuit consisting of T, L and C, as indicated in FIGURE 6. Now the obvious thing to do is, exclusively to use the self-induction of the primary winding $W_1$ of the transformer T as a self-inductance for the series LC-chain, whereby the very simple circuit of FIGURE 5*b* is created.

It is further possible, in circuits of the type shown in FIGURE 4, to derive the voltage $e_1$ from a part of the coil L or from a part of a series circuit of condensers, which is substituted for the capacitance C. More particularly it is possible in these cases to use as a frequency determining element a frequency selective electromechanical element, such as for instance a quartz crystal or a magnetostrictive vibrator, in series with an L or a C, by which the frequency stability of the circuit is very much improved.

In the circuits of the type according to FIGURE 5*a* the series LC-chain can be simply replaced by the abovementioned frequency selective electromechanical element.

FIGURE 7 shows a circuit with a quartz crystal 29, the design of which corresponds to that of FIGURE 4.

Inherent to a quartz crystal is the parasitary parallel capacitance $C_p$, the influence of which can be compensated by a current of opposite phase, which is adjustable by means of the capacitance $C_t$ as to magnitude, as is shown in FIGURE 8 by way of example.

By the presence of $C_p$ and $C_t$ it is now made possible to omit C and at the same time both secondary windings $W_3$ and $(W_2+W'_2)$ can be combined so as to provide FIG. 9.

FIG. 9*a* shows a circuit which is similar to that of FIGURE 9, in which the rectifiers have been arranged in a somewhat different manner, and in which at the same time use is made of a transformer T without a ferromagnetic core and which in this case is connected to a high impedance voltage source, for example a tube.

Here again, the functions of transformation and resonance are separated.

The primary winding of the strongly coupled air transformer has been divided into the parts $W_1$ and $W'_1$ in order to obtain the necessary symmetry in the secondary winding $W_2$.

After this the tube capacitance $C_B$ can be compensated by means of a variable condenser $C_{comp}$, whereby it is also desirable that the self-inductance of the primary winding $(W_1+W'_1)$ be chosen in such a manner as to have it form, in combination with the substitution capacitance for $C_B$ and $C_{comp}$, a circuit which is tuned to the central frequency.

The low internal resistance necessary to obtain sufficient current through the crystal, is attained by giving the air transformer a secondary winding $W_2$ having a smaller number of turns than the winding $(W_1+W'_1)$.

This time again the resonance frequency is determined by the crystal 29.

FIG. 10 refers back to FIGURE 9. The transformer T, provided with the primary winding $W_1$, and the secondary winding $W_2$ again are linked up with a voltage source 20.

The frequency determining element, that is the crystal 29, and the condenser $C_t$ of the FIGURE 9, have in the FIGURE 10 been replaced by the resistance 30 and the condenser 31.

At a determined frequency, $$\omega_0=\frac{1}{RC}$$

the voltage $e_c$ on the condenser 31 is equal to the voltage $e_R$ on the resistance 30 and therefore $E_0=|e_c|-|e_R|=0$. The vector diagram 10*b* shows the vector sum E of the voltage $e_c$ on the condenser 31 and the voltage $e_R$ on the resistance 30, which voltage is otherwise equal to the voltage E on the secondary winding $W_2$ of the transformer T. FIG. 10*a* shows the discrimination curve of the demodulation circuit according to FIG. 10.

In this figure the resistance 30 is in a very general sense represented by the symbol R and the condenser 31 by the symbol C.

From FIGURE 10*a* it is apparent that it is only in a position near the frequency $$\omega_0=\frac{1}{RC}$$

that the circuit operates linear.

In order to improve on this a resistance 33 is connected in parallel to the capacitance 31 and a self-inductance 32 is connected in series to the resistance 30.

In FIGURE 11 this circuit is shown.

FIGURE 11*a* represents the discrimination curve of this circuit. This figure is valid, if for the resistance 33 a value is selected which equals the triple value of the resistance 30, and for the self-inductance 32 an impedance value which equals one third of the value of the resistance 30. In this case $\omega_0$ will be only slightly shifted towards lower frequencies, whilst the discrimination curve gets a good linear tendency over a large frequency range, for instance 30% to the left and to the right of $\omega_0$.

Other values of resistance 33 and self-inductance 32 can also give good results.

Lastly, FIG. 12 shows a circuit which corresponds to the circuit of FIG. 10 and FIG. 11.

In this circuit, instead of the series circuit of FIG. 10, comprising a resistance 30 and the condenser 31, a series circuit comprising a self-inductance 37 and a resistance 36 is applied.

Here again a correction as to the linearity is effected. A capacitance 34, the impedance of which can for instance amount to three times the value of that of the resistance 36, is connected in parallel with the resistance 36.

For the series correction resistance 35 a value is then taken which amounts to for instance one third of the value of the resistance 36.

We claim:

1. Device for the demodulation of a frequency modulated signal comprising a signal source, an input transformer including a primary and secondary winding and having its primary winding connected to the signal source, a rectifying means comprising two rectifiers connected in series with the secondary winding of said transformer, a series circuit comprising at least one resistance and one reactance connected across said secondary winding, the magnitudes of said resistance and said reactance being such that at the central frequency of the signal source the absolute value of the voltage drop across the resistance is equal to the absolute value of the voltage drop across the reactance, a parallel circuit connected between the rectifiers comprising a center-tapped resistance and a series connection of two equal capacitors and a pair of output terminals, one terminal of which is connected to the center tap of the resistance and the other terminal of which is connected to the common connection points of the series circuit resistance and reactance and of said two equal capacitors.

2. Device according to claim 1, wherein said reactance is a condenser.

3. Device according to claim 1, wherein said reactance is an inductance.

4. Device according to claim 1, wherein said reactance is a parallel connection of a capacitance with a resistance and wherein the series circuit includes an inductance.

References Cited in the file of this patent

UNITED STATES PATENTS

| | | |
|---|---|---|
| 2,496,818 | Seeley | Feb. 7, 1950 |
| 2,654,841 | Dutton | Oct. 6, 1953 |
| 2,751,495 | Grady | June 19, 1956 |
| 2,873,365 | Janssen | Feb. 10, 1959 |